United States Patent
Skaarsjoe

(10) Patent No.: US 11,225,839 B2
(45) Date of Patent: Jan. 18, 2022

(54) ATTACHMENT DEVICE FOR MARINE RISER BUOYANCY MODULE

(71) Applicant: MHWIRTH DO BRASIL EQUIPAMENTOS LTDA., Rio de Janeiro (BR)

(72) Inventor: David Skaarsjoe, Rio de Janeiro (BR)

(73) Assignee: MHWIRTH DO BRASIL EQUIPAMENTOS LTDA., Rio de Janeiro (BR)

(*) Notice: Subject to any disclaimer, the term of this patent is extended or adjusted under 35 U.S.C. 154(b) by 0 days.

(21) Appl. No.: 16/959,735

(22) PCT Filed: Dec. 14, 2018

(86) PCT No.: PCT/NO2018/050312
§ 371 (c)(1),
(2) Date: Jul. 2, 2020

(87) PCT Pub. No.: WO2019/139483
PCT Pub. Date: Jul. 18, 2019

(65) Prior Publication Data
US 2020/0386059 A1 Dec. 10, 2020

(30) Foreign Application Priority Data
Jan. 9, 2018 (NO) .................................. 20180032

(51) Int. Cl.
*E21B 17/01* (2006.01)
*E21B 19/00* (2006.01)

(52) U.S. Cl.
CPC .......... *E21B 17/012* (2013.01); *E21B 19/002* (2013.01)

(58) Field of Classification Search
CPC .............................. E21B 17/012; E21B 19/002
USPC .......................................................... 166/350
See application file for complete search history.

(56) References Cited

U.S. PATENT DOCUMENTS 4,477,207 A * 10/1984 Johnson .................... F16L 1/24
166/350
5,722,340 A 3/1998 Sweetman
6,048,136 A * 4/2000 Denison ................ B63B 21/502
114/243

(Continued)

FOREIGN PATENT DOCUMENTS

GB 2441534 A 3/2008
WO 2004/090348 A1 10/2004

(Continued)

OTHER PUBLICATIONS

International Search Report and Written Opinion dated Mar. 14, 2019 for PCT/NO2018/050312, 8 pages.

(Continued)

*Primary Examiner* — Matthew R Buck
*Assistant Examiner* — Patrick F Lambe
(74) *Attorney, Agent, or Firm* — Sage Patent Group

(57) ABSTRACT

An attachment device for securing a buoyancy module to a riser, the attachment device comprising an annular collar which is split into at least two parts, and at least one flange part, which is separable from the collar and has a generally planar flange and a connecting formation by means of which the flange part may be releasably connected to the collar so that the flange extends radially outwardly relative to the collar.

16 Claims, 4 Drawing Sheets

(56) References Cited

U.S. PATENT DOCUMENTS

Figure 1:
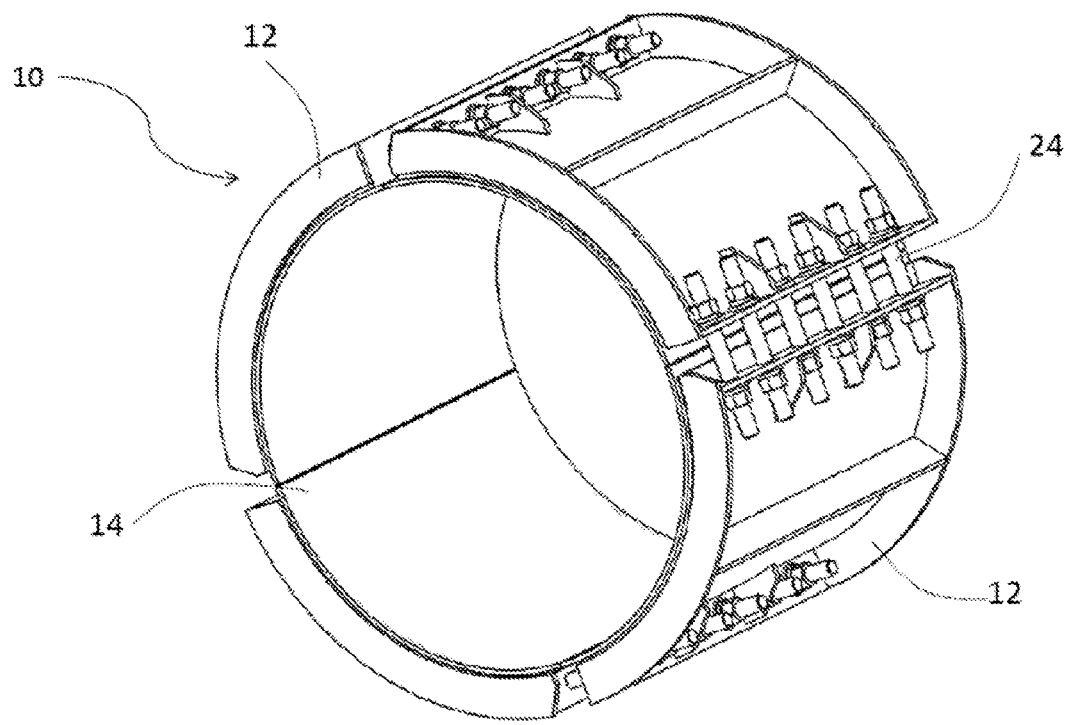

| | | | | |
|---|---|---|---|---|
| 7,628,665 | B1* | 12/2009 | Cook | E21B 17/012 405/195.1 |
| 7,988,104 | B1* | 8/2011 | Cook | E21B 17/01 248/68.1 |
| 8,727,667 | B2* | 5/2014 | West | F16B 7/0406 405/216 |
| 8,800,664 | B2* | 8/2014 | Gollmyer | E21B 17/1064 166/350 |
| 8,882,066 | B2* | 11/2014 | Otten | B65D 63/00 248/230.8 |
| 9,022,827 | B2* | 5/2015 | Snyder, II | F16L 1/24 441/133 |
| 9,399,893 | B2* | 7/2016 | Viellard | E21B 17/1035 |
| 10,107,048 | B2* | 10/2018 | Chen | E21B 17/012 |
| 10,669,785 | B1* | 6/2020 | Allen | E21B 17/012 |
| 2011/0017516 | A1* | 1/2011 | Gollmyer | E21B 17/1078 175/325.7 |
| 2012/0247782 | A1* | 10/2012 | Smith | E21B 17/012 166/350 |
| 2016/0237758 | A1* | 8/2016 | Whitefield | E21B 17/01 |

FOREIGN PATENT DOCUMENTS

| | | |
|---|---|---|
| WO | 2007/064229 A1 | 6/2007 |
| WO | 2010/053447 A1 | 5/2010 |
| WO | 2010/107322 A1 | 9/2010 |
| WO | 2012/159146 A1 | 11/2012 |
| WO | 2016/056914 A2 | 4/2016 |

OTHER PUBLICATIONS

Norwegian Search Report dated Jul. 13, 2018 for Norwegian Patent No. 20180032, 2 pages.

New Norwegian Search Report dated Mar. 12, 2019 for Norwegian Patent No. 20180032, 2 pages.

* cited by examiner

ATTACHMENT DEVICE FOR MARINE RISER BUOYANCY MODULE

CROSS-REFERENCE TO RELATED APPLICATIONS

This application is a 35 U.S.C § 371 national stage application for International Application No. PCT/NO2018/050312, entitled "Attachment Device for Marine Riser Buoyancy Module", filed on Dec. 14, 2018, which claims priority to Norwegian Patent Application No.: NO20180032, entitled "Attachment Device for Marine Riser Buoyancy Module", filed on Jan. 9, 2018, the disclosures and contents of which are hereby incorporated by reference in their entireties.

The present invention relates to an attachment device suitable for securing a buoyancy module to a marine riser.

In offshore drilling operations a drill pipe extends down from a drilling rig into the well bore, and is enclosed by a tubular drilling riser which is suspended from the drilling rig and connected to a well head mounted at the top of the well bore on the sea bed. The riser is typically made from a plurality of riser segments connected end to end by means of a flanged connection joint. Each end of riser segment is provided with a radially outwardly extending connection flange including an array of bolt holes, and adjacent segments are connected together using a plurality of bolts each of which extend through a bolt hole in one of the flanges into the bolt hole. Piping for auxiliary lines such as choke and kill lines, boost lines, and hydraulic supply and control lines extend along the riser, mounted on the outside of the riser.

It is known to provide the riser with a plurality of buoyancy modules which reduce the weight of the submerged riser that the drilling rig has to support. These are fitted at intervals along the length of the riser, and typically comprise a low density filler material, such as a foam and/or hollow fibreglass macrospheres, encapsulated by a rigid outer shell, which may be made from a polymer such as high density polyethylene or a glass reinforced polymer (GRP). The buoyancy aid may alternatively be hollow or additionally include a hollow portion which can be selectively filled with a liquid or gas in order to control the buoyancy of the module. Examples of such buoyancy modules are described in WO 2010/053447, US2012/247782, U.S. Pat. Nos. 7,628,665, and 4,477,207. An attachment device is provided to prevent or substantially prevent axial movement of the buoyancy module relative to the riser, and to transmit the buoyancy thrust to the riser.

In the embodiment illustrated in U.S. Pat. No. 4,477,207, the buoyancy modules are provided in three segments, each of which extends parallel to the longitudinal axis of the riser in between the external piping for the auxiliary lines. This application also describes a clamp assembly for securing the buoyancy modules to the riser (and also for providing additional support for the external piping). The clamp assembly comprises a multi-part circular collar which is secured around the circumference of the riser by means of a plurality of bolts. Straps are used to secure each segment of the buoyancy module to the band, the ends of each strap being fastened, by means of a tensioner, to a portion of the collar between adjacent segments, and extending around the exterior surface of the buoyancy module segment.

In an alternative embodiment, the buoyancy module is divided into two segments which are fastened together around the riser to form a complete cylindrical tube, which surrounds the exterior piping. In this embodiment, longitudinally extending recesses are provided in the radially inward facing surface of the buoyancy module, and the buoyancy module orientated so that each external pipe extends along one of these recesses. In this embodiment, the buoyancy module cannot be secured to the riser in the way described in U.S. Pat. No. 4,477,207, because there are no gaps between the segments. In this embodiment, the collar is provided with an integral radially outwardly extending flange which is located above the uppermost edge of the buoyancy module. This collar is referred to as a thrust collar. To prevent the buoyancy module from falling down to the bottom flange connection while the riser is handled vertically in air, a further collar, similar to the thrust collar, is fitted to the riser below each buoyancy module. This collar is referred to as a stop collar. The stop collar will be subject to the gravity loads representing the dry weight of the buoyancy and in addition shock loads during handling.

It should be appreciated that the description below relating to a thrust collar could equally be applied to the stop collar.

An annular elastomeric liner is provided between the thrust collar and the riser. This provides electrical insulation between the collar and the pipe, works to protect the coating from damage. It may also increase the frictional forces between the collar and the riser, and thus assist in preventing the collar from slipping relative to the riser, either longitudinally or rotationally. When the thrust collar is secured around the riser, it is preferably tightened sufficiently to compress the liner slightly. The provision of such a liner may assist in ensuring that expansion and contraction of the riser due to fluctuating temperature can be accommodated. If the riser expands, the liner will be compressed further, and if the riser contracts, the liner expands so that the collar remains secure relative to the riser.

The thrust collar fits in between the riser and the external piping, and, as such the size of the flange is restricted to ensure that the collar can be fitted into this relative small gap.

An example of such a prior art thrust collar and liner is illustrated in FIG. 1 which shows the thrust collar 10, flange 12, and liner 14, and bolts 24 by means of which the parts of the collar are fastened together.

The present invention relates to an improved thrust/stop collar.

According to a first aspect of the invention we provide an attachment device for securing a buoyancy module to a riser, the attachment device comprising an annular collar which is split into at least two parts, and at least one flange part which is separable from the collar and which has a generally planar flange and a connecting formation by means of which the flange part may be releasably connected to the collar so that the flange extends radially outwardly relative to the collar.

In one embodiment, the flange extends generally perpendicular to a longitudinal axis of the collar.

By virtue of making the flange part separable from the collar, the collar can be mounted around the riser without the flange part in place, which may make it easier to fit the collar into the restricted spaces between the riser and the external piping. Once the collar is in place, the flange parts can be mounted on the collar, and the attachment device may then be used to secure a buoyancy module to the riser as in the prior art. The flange parts may be rotated to get them into the required position for mounting on the collar, and, therefore the flanges may be deeper (i.e. extend further in a radial outward direction relative to the riser) than the flanges in the prior art collar. This may reduce the likelihood of the flange damaging the buoyancy element when loaded.

Preferably the flange part is generally rigid.

In one embodiment, the parts of the collar are bolted together.

In a preferred embodiment, the collar is split into two generally semi-circular or virtually semi-circular parts.

Advantageously, the attachment device is provided with a plurality of flange parts, and sufficient flange parts are provided so that flanges can be arranged next to one another so that the flanges of all the flange parts together form a generally annular array.

The flange may include at least one generally semi-circular recess which is provided in a radially outward edge of the flange when the flange part is mounted on the collar. The flange parts can then be positioned so that a portion of external piping lies in the recess when the flange part is mounted on the collar around a riser.

A radially inwardly facing surface of the collar may be provided with a liner, so that the liner lies between the annular collar and the riser when the collar is mounted on a riser, the liner being made from a material which has at least one of the following properties: acts to increase the coefficient of friction between the collar and the riser, provides electric insulation, and protects the adjacent surfaces of the riser and collar from damage.

The liner may be made from an elastomer such as rubber. In a preferred embodiment of the invention, however, the liner is made from a non visco-elastic material. In this case, the liner may be made from a glass reinforced polymer.

When the liner is made from a viscoelastic material such as rubber, it has been found that after prolonged periods of use, the rubber starts to creep, and this can cause the collar to become loose.

According to a second aspect of the invention we provide a riser assembly comprising a riser having a longitudinal axis, an attachment device according to the first aspect of the invention mounted around the riser, and a buoyancy module mounted around the riser with the flange of the attachment device engaging with the buoyancy module to restrict movement of the buoyancy module parallel to the longitudinal axis of the riser.

The buoyancy module may comprise two parts which together form an annulus around the riser.

The riser assembly may include a pair of attachment devices according to the first aspect of the invention, the attachment devices being mounted around the riser with the buoyancy module lying between the flanges of the two attachment devices, the flange of one of the attachment devices restricting movement of the buoyancy module in a first direction parallel to the longitudinal axis of the riser, and the flange of the other of the attachment devices restricting movement of the buoyancy module in a second direction parallel to the longitudinal axis of the riser, the first direction being opposite to the second direction.

According to a third aspect of the invention we provide a method of securing a buoyancy element to a riser using an attachment device according to the first aspect of the invention, the method comprising the steps of securing the collar of the attachment device around the riser, using the connection formations to secure the flange parts on the collar, and mounting the buoyancy module around the riser such that the flange of each flange part of the attachment device engages with the buoyancy module to restrict movement of the buoyancy module parallel to the longitudinal axis of the riser.

The method may further include securing a second attachment device according to the first aspect of the invention to the riser, by securing the collar of the second attachment device around the riser, using the connection formations to secure the flange parts on the collar, the attachment devices being mounted around the riser with the buoyancy module lying between the flanges of the two attachment devices, the flange of the first attachment device restricting movement of the buoyancy module in a first direction parallel to the longitudinal axis of the riser, and the flange of the second attachment device restricting movement of the buoyancy module in a second direction parallel to the longitudinal axis of the riser, the first direction being opposite to the second direction.

Figure 2:
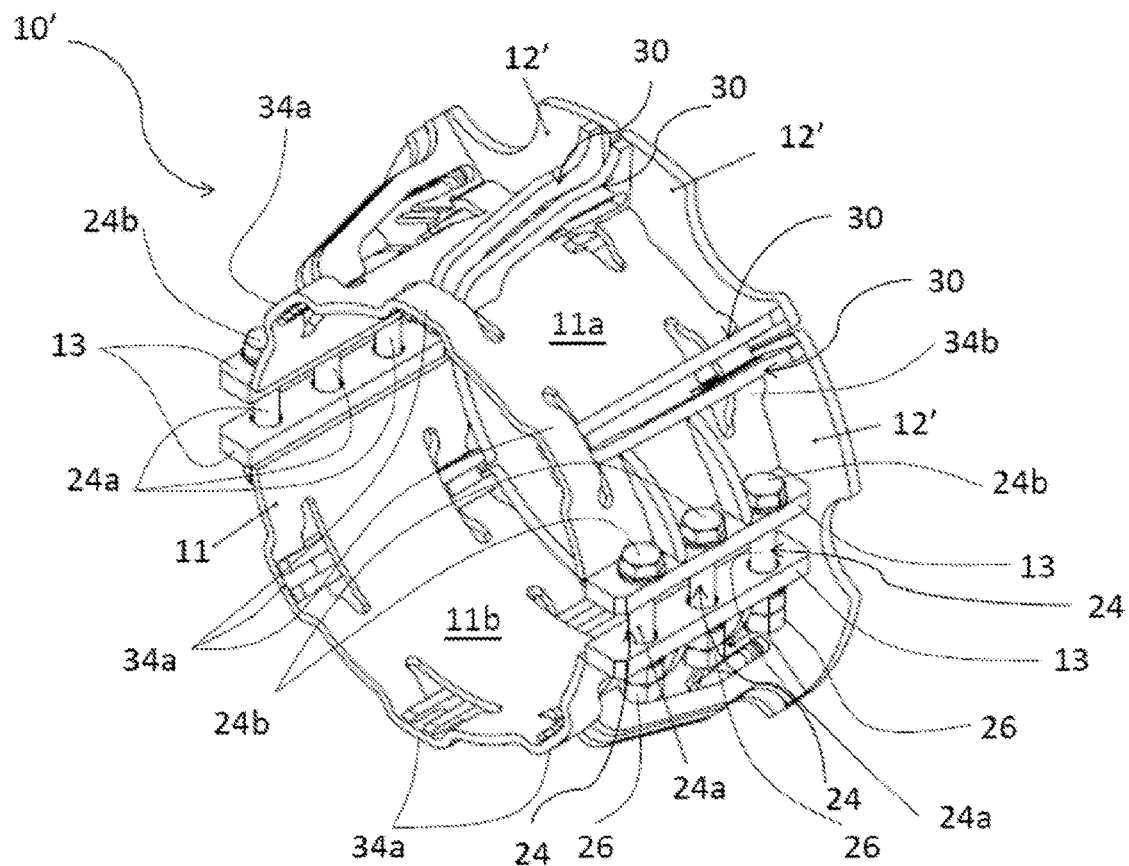
Figure 3:
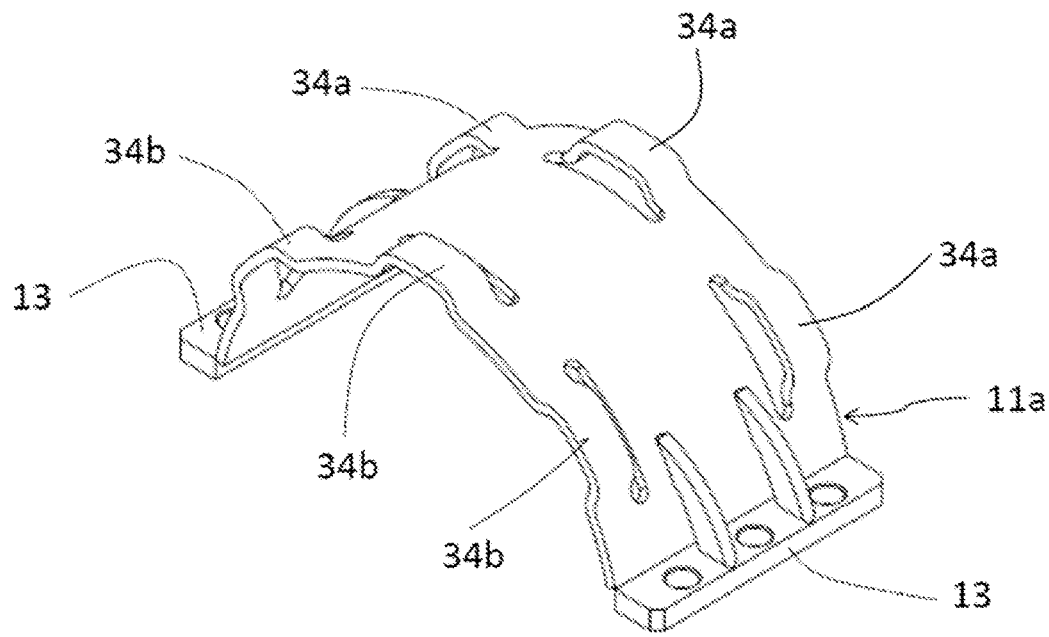
Figure 4:
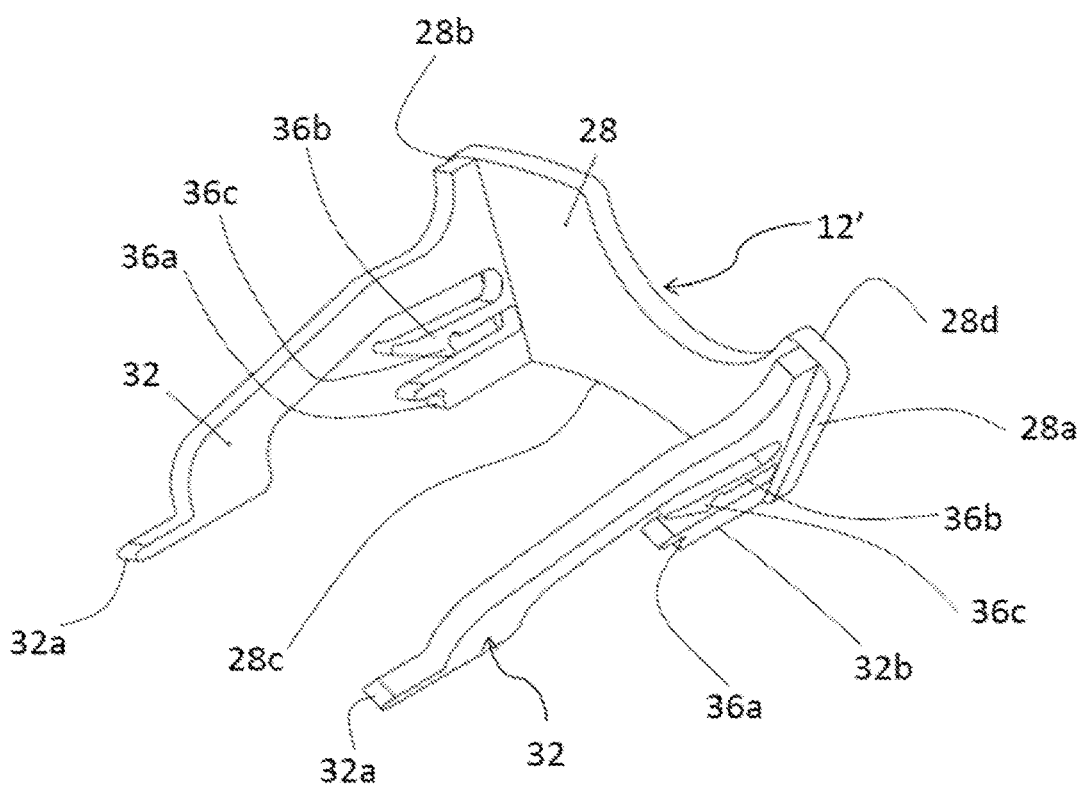
Figure 6:
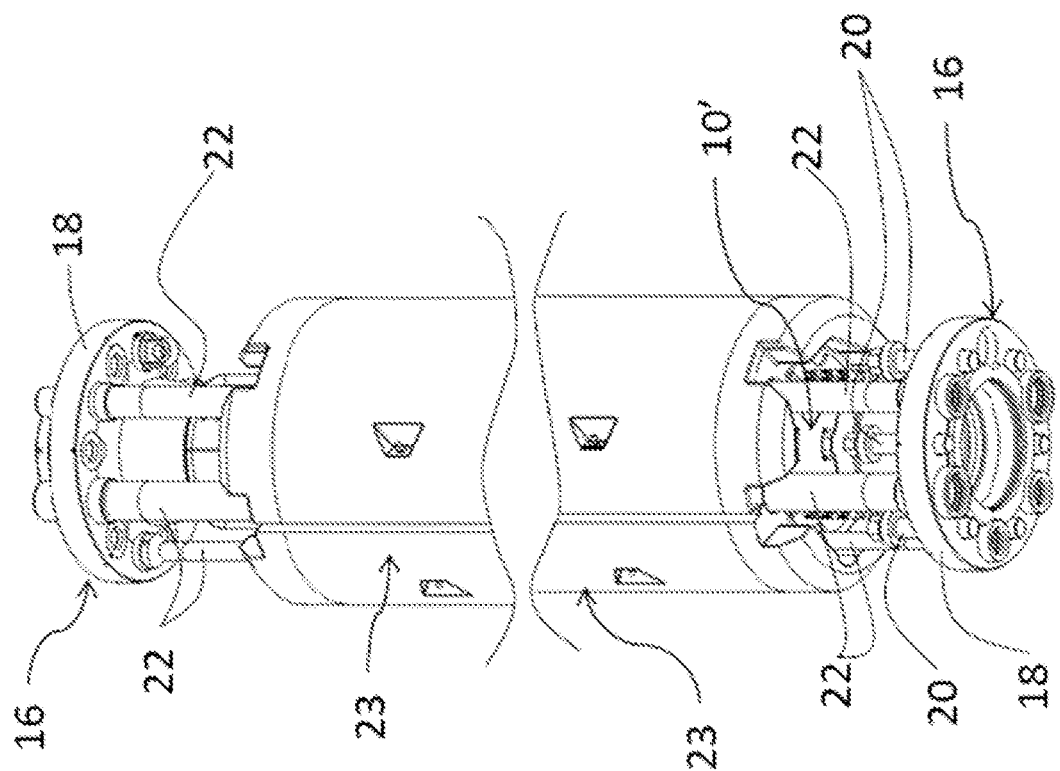
Figure 5:
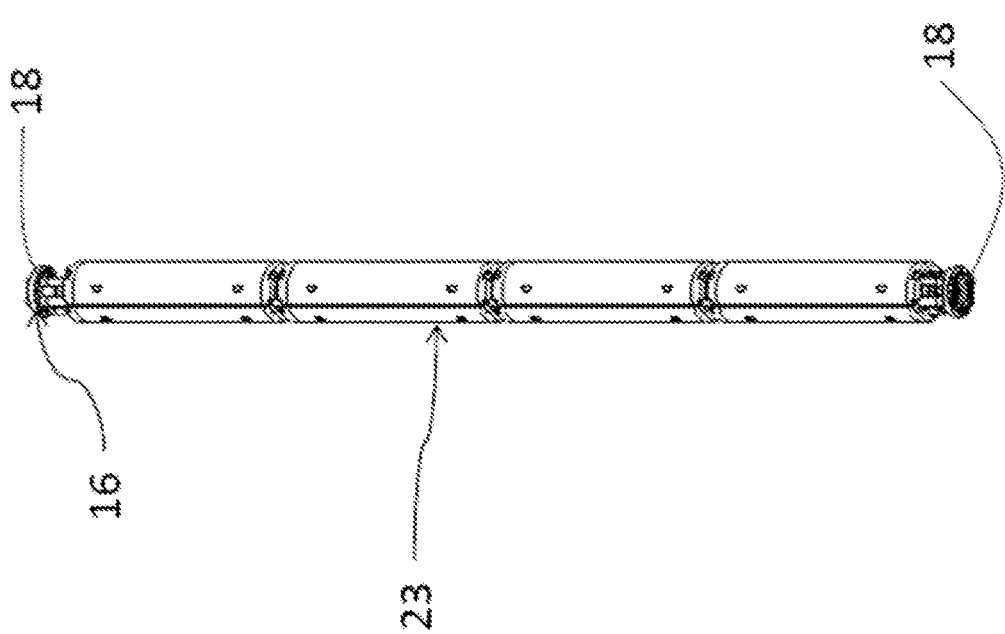
Figure 7:
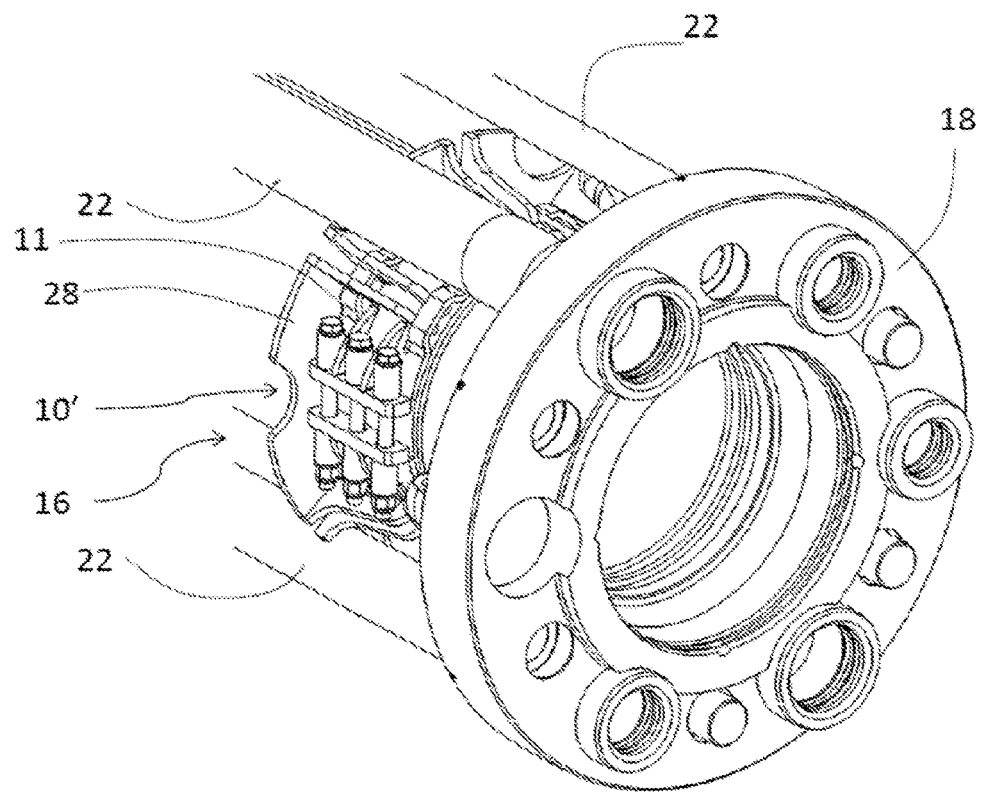
Figure 8:
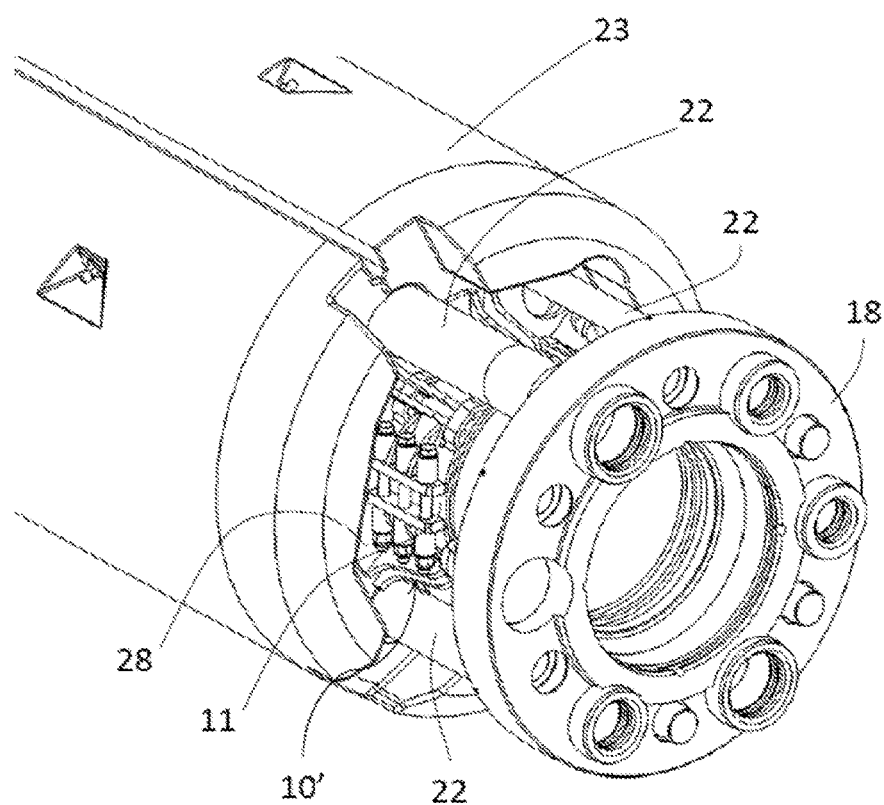

An embodiment of the invention will now be described, by way of example only, with reference to the accompanying drawings of which:

FIG. 1 illustrates a perspective view of a collar according to prior art,

FIG. 2 is a perspective illustration of an attachment device according to the first aspect of the invention, FIG. 3 is a perspective illustration of one part of the collar of the attachment device illustrated in FIG. 3, FIG. 4 is a perspective illustration of a flange part of the attachment device illustrated in FIG. 3, and FIG. 5 is a perspective illustration of a riser assembly according to the second aspect of the invention, FIG. 6 is a perspective illustration of the ends of the riser assembly illustrated in FIG. 5, FIG. 7 is a perspective illustration of the lowermost end of the riser assembly illustrated in FIG. 5 without the buoyancy module in place, and FIG. 8 is a perspective illustration of the lowermost end of the riser assembly illustrated in FIG. 5.

Referring now to FIG. 2 there is provided an attachment device 10' for securing a buoyancy module to a riser, the attachment device comprising an annular collar 11 which is split into at least two parts. In this embodiment, the collar 11 is split into two generally semi-circular parts 11a, 11b, one of which is illustrated in FIG. 3, although it will be appreciated that it could equally be split into more parts which when connected together form a circle. The collar 11 has a longitudinal axis which extends along the cylinder axis of the cylindrical space enclosed by the collar 11. The collar 11 may be made from a metal.

In this embodiment, the two collar parts 11a, 11b are bolted together. The ends of each part 11a, 11b are generally L-shaped in transverse cross-section, and include a lip formation 13 which extends radially outwardly of the collar 1 from the two edges of each part 11a, 11b which are parallel to the longitudinal axis of the collar 11. A plurality of circular bolt holes (three in this example) are provided in each lip formation 13, and the two parts 11a, 11b are placed with each lip formation adjacent a corresponding lip formation of the other of the two parts 11a, 11b, with the bolt holes aligned. The threaded shank 24a of a bolt 24 is inserted through one of the bolt holes in the lip formation 13 of the first of the two parts 11a and into the corresponding bolt hole in the lip formation of the second of the two parts 11b, so that the bolt head 24b rests on the lip formation 13 of the first part 11a. A nut 26 is fastened to the end of the shank 24a to prevent the two parts 11a, 11b from being separated. In the embodiment illustrated in FIG. 3, two such nuts 26 are mounted on each bolt 24. Bolts 24 are inserted into the other bolt holes in the same way.

In this embodiment of the invention, the two parts 11a, 11b of the collar 11 are designed such that they do not form a complete circle, and the lip formations 13 are spaced from one another when the collar is mounted around a riser, with the bolts 24 extending between the two parts 11a, 11b as illustrated in FIG. 2. This means that variations in the outer diameter of the riser can be accommodated by moving the nuts 26 along the shanks 24a of the bolts 24 to vary the separation of the adjacent lip formations 13. The bolt assembly is sub-sequentially used to tension the two collars, 11a and 11b, in order to elastically stretch them over the pipe to provide a constant radial force between the collar and the pipe. The cross-section of collar 11 is advantageously made as thin as possible in order to allow its elongation in the elastic range of the material, to compensate for variations of the riser pipe outer diameter which may fluctuate due to operational load cases; typically strain, pressure and temperature.

Whilst, in this embodiment, the collar 11 is split into two parts 11a, 11b, it will be appreciated that it could equally be split into 3 or more parts, each of which is connected to the adjacent part in the same way.

In this embodiment, a radially inwardly facing surface of the collar 11 is provided with a liner (as illustrated in FIG. 1), so that the liner lies between the collar 11 and the riser 16 when the collar 11 is mounted on a riser 16, the liner being made from a material which acts to increase the coefficient of friction between the collar 11 and the riser, provide electric insulation, and protect the adjacent surfaces of the riser 16 and collar 11 from damage.

The liner may be made from an elastomer such as rubber. However, when the liner is made from rubber, it has been found that after prolonged periods of use, the rubber starts to creep, and this can cause the collar 11 to become loose.

As such, in a preferred embodiment of the invention, however, the liner is made from a non-viscoelastic material, such as a fibre reinforced polymer. The liner could be made from the fibre reinforced composite materials used in the riser clamp described in WO2010107322, for example. In one embodiment, a glass reinforced rubber modified epoxy based vinyl ester is used.

The glass fibres are preferably arranged to extend at around 45° to the circumference of the collar 11.

In one embodiment, three layers of glass fibre reinforcement are provided, with a peel—ply layer being located at both outer surfaces of the liner. The rough texture of the surface of the liner revealed by pulling off the peel—ply increases the coefficient of friction between the liner and the riser/collar, and therefore may assist in ensuring that there is no movement between these parts.

The liner may be secured to the collar 11, for example it may be molded around the collar, or stuck to the collar using an appropriate adhesive. In a preferred embodiment of the invention, the liner is, however, entirely separate from the collar 11, and is simply clamped in place between the collar 11 and the riser.

The attachment device 10' further includes a plurality of generally rigid flange parts 12', each of which has a generally planar flange 28 and a connecting formation 30 by means of which the flange part 12' may be releasably connected to the collar 11 so that the flange 28 extends radially outwardly relative to the collar 11. The flange part 12' is advantageously made of metal. One of the flange parts 12' is illustrated in FIG. 4. In this embodiment, the flange 28 extends generally perpendicular to the longitudinal axis of the collar 11.

Sufficient flange parts 12' are provided so that flanges 28 can be arranged next to one another so that the flanges 28 of all the flange parts 12' together form a generally annular array. In this embodiment, the anchor device 10' is provided with 6 flange parts 12'.

Each flange 28 has a first end 28a, and a second end 28b, and two edges which extend between the two ends 28a, 28b—a radially inward edge 28c and a radially outward edge 28d. The edges 28c, 28d are curved so that the flange 28 forms a sector of an annulus, and an approximately semi-circular recess is provided in the radially outward edge 28d, in this embodiment, generally centrally between the two ends 28a, 28b.

In this embodiment, the connecting formation of each flange part 12' comprises two hook parts 32, each of which is mounted at or adjacent one of the ends 28a, 28b of the flange 28 and extends generally perpendicular to the plane of the flange 28.

The collar 11 is provided with corresponding connecting formations with which the connecting formations of each flange part 12' engage to restrict movement of the flange part 12' relative to the collar 11.

In this embodiment, the connecting formations on the collar comprise a pair of loop formations 34a, 34b provided on the collar 11 for each pair of hook parts 32 at the adjacent ends 28a, 28b of neighbouring flanges 28, the loop formations 34a, 34b being spaced relative to one another in a direction generally parallel to the longitudinal axis A of the collar 11. It will be appreciated that a pair of loop formations 34a, 34b could be provided for each hook part 32.

Each hook part 32 has a pointed free end 32a which is inserted into one of the loop formations 34a of the pair, the free end 32a being shaped such that an outer edge of the hook part 32 engages with the loop formation 34a to ensure that the hook part 32 is lodged in a desired position in the loop formation 34a, and cannot be pushed any further through the loop formation 34a. The engagement of the end 32a of the hook part 32 with the loop formation 34a therefore restricts movement of the flange part 12' in a first direction parallel to the longitudinal axis A of the collar 11.

The opposite end of each hook part 32 is secured (typically welded) to the flange 28, and is provided with a two pronged, U-shaped, hook 32b, having a radially inward prong 36a and a radially outward prong 36b, both of which extend generally parallel to the hook part 32 towards the free end 32a of the hook part 32. The radially inward prong 36a is inserted into the other loop formation 34b of the pair, whilst a radially outward prong 36b lies along the radially outward side of the loop formation 34b. The radially outward prong 36b also includes a radially inwardly directed lip 36c which engages with the loop formation 34b to prevent movement of the flange part 12' in a second direction parallel to the longitudinal axis A of the collar 11 (the second direction being opposite to the first direction).

The location of the radially inward prong 34a and the free end 32a of the two hook parts 32 of each flange part 12' in the two pairs of loop formations 34a, 34b thus prevents the flange part 12' from moving in a radial direction to separate the flange part 12' from the collar 11.

By virtue of making the flange part 12' separable from the collar 11, the collar 11 can be mounted around the riser 16 without the flange part 12' in place, which may make it easier to fit the collar 11 into the restricted spaces between the riser 16 and the external piping 22.

It will be appreciated that the connecting formations of the flange 28 need not be exactly as described above. For example, the radially outward prong 36b need not be provided with a radially inwardly directed lip 36c. In this case, an alternative fastening may be used to substantially prevent movement of the flange part 12' in the second direction. The alternative fastening may be a screw, pin or wire rope, which pass through corresponding holes in connection formation and the collar 11.

Moreover, the radially outward prong 36b could be omitted entirely, in order to further simplify the connecting formations. In this case, the radially inward prong 36a is inserted into the other loop formation 34b of the pair, as before, whilst the hook part 32 rests along the radially outward side of the loop formation 34b.

The attachment device 10' may be used to secure a buoyancy module 23 to a riser 16, as illustrated in FIGS. 5, 6 and 8. The riser 16 has a connection flange 18 including a plurality of bolt holes at either end. In FIG. 6, the bolts 20 by means of which the riser 16 may be secured to an adjacent riser can be seen in the bolt holes of the connection flange 18 at the lowermost end of the riser 16. External piping 22 at the ends of the riser 16, and extends longitudinally along the entire length of the riser 16.

It will be appreciated that a plurality of buoyancy modules 23 may be secured to the riser 16. In the embodiment illustrated in FIGS. 5 and 6, four buoyancy modules 23 are provided, and cover virtually the entire length of the riser 16. Each buoyancy module 23 may be split longitudinally into two substantially identical segments which together form a cylindrical tube around the riser 16. The buoyancy modules 23 may, however, be split longitudinally into more than two segments which together form a cylindrical tube around the riser 16. For example, each buoyancy module may be split into three segments, one which covers a 180° segment of the circumference of the riser 16, and two which each cover a 90° segment of the circumference of the riser 16.

To fit the attachment device 10' to a riser 16, as illustrated in FIG. 7, the two separated parts of the collar 11 are placed around the riser 16, the parts being inserted between the external piping 22 and the riser 16 so the external piping 22 are located radially outwardly of the collar 11. The adjacent lip formations 13 are bolted together, and the nuts 26 tightened to provide the required degree of tension to securely clamp the collar 11 around the riser 16 and prevent movement of the collar 11 relative to the riser 16.

Once the collar is in place, the flange parts 12' can be mounted on the collar 11. The flange parts 12' may be rotated to get them into the required position for mounting on the collar 11. For example, the flange part 12' could be rotated so that the flange 28 is orientated radially with respect to the riser 16. The hook part 32 can then be inserted between the riser 16 and the external piping 22, and then the flange part 12' rotated through 90° so that the hook parts 32 extend radially outwardly relative to the riser 16. The flange part 12' can then be positioned so that a portion of external piping is adjacent to the semi-circular recess, and the flange part 12' rotated through a further 90° so that the plane of the flange 28 extends generally perpendicular to the longitudinal axis of the riser 16, and the hook parts 32 are generally parallel to the longitudinal axis of the riser 16, and can be inserted into loop formations 34a, 34b as described above, the external piping thus sitting in the semi-circular recess.

The attachment device may be used to secure a buoyancy module to the riser 16 as in the prior art, and as illustrated in FIGS. 5, 6 and 8. Specifically, two attachment devices 10' according to the invention are secured to the riser 16 as described above, the two attachment devices 10' being spaced such that a buoyancy module 23 may be mounted around the riser 16 between the flanges 28 of the two attachment devices 10', with the lowermost end of the buoyancy module 23 adjacent the flange 28 of the lowermost attachment device 10' and the uppermost end of the buoyancy module 23 adjacent the flange 28 of the uppermost buoyancy module, and as illustrated in FIG. 7.

Engagement of the flanges 28 of the uppermost attachment device with the end of the uppermost buoyancy element 23 thus restricts movement of the uppermost buoyancy module 23, and engagement of the flanges 20 of the lowermost attachment device with the end of the lowermost buoyancy module 23 thus restricts movement of the lowermost buoyancy module 23.

One buoyancy module 23 may be mounted between a pair of attachment devices 10'. Alternatively, where the riser 16 is provided with a plurality of buoyancy modules 23, as illustrated in FIG. 5, more than one buoyancy modules 23 may be mounted between a pair of attachment devices 10'.

As a result of separating the flange parts 12' from the collar 11, the flanges 28 may be deeper (i.e. extend further in a radial outward direction relative to the riser 16) than the flanges 12 in the prior art collar 11. This may reduce the likelihood of the flanges 28 digging into the external shell of the buoyancy element and damaging the buoyancy element when loaded.

The invention claimed is:

1. An attachment device for securing a buoyancy module to a riser, the attachment device comprising an annular collar which is split into at least two parts, and at least one flange part which is separable from the collar, the flange part having a generally planar flange and a connecting formation by means of which the flange part is releasably connected to the collar so that the flange extends radially outwardly relative to the collar, the connecting formation comprising two hooks parts which extend generally perpendicular to the flange and engage corresponding collar connecting formations provided on the collar.

2. The attachment device according to claim 1, wherein the parts of the collar are bolted together.

3. The attachment device according to claim 1, wherein the collar is split into two generally semi-circular or virtually semi-circular parts.

4. The attachment device according to claim 1, wherein the flange includes at least one generally semi-circular recess which is provided in a radially outward edge of the flange when the flange part is mounted on the collar.

5. The attachment device according to claim 1 wherein the collar encloses a generally cylindrical space and has a longitudinal axis which extends along a cylinder axis of the cylindrical space, the collar connecting formations comprising two pairs of loop formations, the loop formations in each pair being spaced relative to one another in a direction generally parallel to the longitudinal axis of the collar.

6. The attachment device according to claim 5 wherein each hook part has a pointed free end which is inserted into one of the loop formations to restrict movement of the flange part in a direction parallel to the longitudinal axis of the collar.

7. A riser assembly comprising a riser having a longitudinal axis, an attachment device for securing a buoyancy module to a riser, the attachment device comprising an annular collar which is split into at least two parts, and at least one flange part which is separable from the collar, the flange part having a generally planar flange and a connecting formation by means of which the flange part is releasably connected to the collar so that the flange extends radially outwardly relative to the collar and has a restriction of movement relative to the collar, the attachment device being mounted around the riser so that movement of the collar relative to the riser is prevented, there being a buoyancy module mounted around the riser such that the flange of each flange part of the first attachment device engages with the buoyancy module to restrict movement of the buoyancy module parallel to the longitudinal axis of the riser.

8. The riser assembly according to claim 7 further including a pair of attachment devices, the pair of attachment devices being mounted around the riser with the buoyancy module lying between the flanges of the pair of attachment devices, the flange of one of the pair of attachment devices restricting movement of the buoyancy module in a first direction parallel to the longitudinal axis of the riser, and the flange of the other of the pair of attachment devices restricting movement of the buoyancy module in a second direction parallel to the longitudinal axis of the riser, the first direction being opposite to the second direction.

9. The riser assembly according to claim 7 wherein the connection formation comprises two hooks parts which extend generally perpendicular to the flange and engage corresponding collar connecting formations provided on the collar.

10. The riser assembly according to claim 9 wherein the collar encloses a generally cylindrical space and has a longitudinal axis which extends along a cylinder axis of the cylindrical space, the collar connection formations comprising two pairs of loop formations, the loop formations in each pair being spaced relative to one another in a direction generally parallel to the longitudinal axis of the collar.

11. The riser assembly according to claim 10 wherein each hook part has a pointed free end which is inserted into one of the loop formations to restrict movement of the flange part in a direction parallel to the longitudinal axis of the collar.

12. A method of securing a buoyancy element to a riser using a first attachment device for securing a buoyancy module to a riser, the first attachment device comprising an annular collar which is split into at least two parts, and at least one flange part which is separable from the collar, the flange part having a generally planar flange and a connecting formation by means of which the flange part may be releasably connected to the collar so that the flange extends radially outwardly relative to the collar, the method comprising the steps of securing the collar of the first attachment device around the riser so that movement of the collar relative to the riser is prevented, using the connection formations to secure each flange parts on the collar and restricted from movement relative to the collar, and mounting the buoyancy module around the riser such that the flange of each flange part of the first attachment device engages with the buoyancy module to restrict movement of the buoyancy module parallel to the longitudinal axis of the riser.

13. The method of claim 12 further including securing a second attachment device, by securing the collar of the second attachment device around the riser, using the connection formations to secure the flange parts on the collar, the first attachment device and the second attachment device being mounted around the riser with the buoyancy module lying between the flanges of the first attachment device and the second attachment device, the flange of the first attachment device restricting movement of the buoyancy module in a first direction parallel to the longitudinal axis of the riser, and the flange of the second attachment device restricting movement of the buoyancy module in a second direction parallel to the longitudinal axis of the riser, the first direction being opposite to the second direction.

14. The method of securing a buoyancy element to a riser according to claim 12 wherein the connecting formation comprises two hooks parts which extend generally perpendicular to the flange and engage corresponding collar connecting formations provided on the collar, and the step of securing each flange part on the collar comprises hooking the hook parts onto the collar connecting formations.

15. The method of securing a buoyancy element to a riser according to claim 14 wherein the collar encloses a generally cylindrical space and has a longitudinal axis which extends along a cylinder axis of the cylindrical space, the collar connecting formations comprising two pairs of loop formations, the loop formations in each pair being spaced relative to one another in a direction generally parallel to the longitudinal axis of the collar, and the step of securing each flange part on the collar comprises hooking each hook part onto the loop formations of one of the pairs of loop formations.

16. The method of securing a buoyancy element to a riser according to claim 15 wherein each hook part has a pointed free end which is inserted into one of the loop formations to restrict movement of the flange part in a direction parallel to the longitudinal axis of the collar.

* * * * *